United States Patent Office 2,725,369
Patented Nov. 29, 1955

2,725,369

COPOLYMERS OF TRIPHENYLETHYLENE

Preston Robinson, Williamstown, Mass., assignor to Sprague Electric Company, North Adams, Mass., a corporation of Masaschusetts No Drawing. Application June 25, 1953,
Serial No. 364,195

8 Claims. (Cl. 260—80.5)

The present invention relates to a new class of copolymers of triphenylethylene which are extremely advantageous for many electrical applications.

At the present time, styrene is used rather extensively as a dielectric in the manufacture of electrical capacitors and related devices. Unfortunately, this material is severely limited in its applications by virtue of its comparatively low melting or softening point, as well as certain of its electrical characteristics. A similar vinyl compound, polymerized N-vinyl carbazole has been used in place of styrene in many applications because it is capable of withstanding substantially higher temperatures than styrene itself. Unfortunately, however, polyvinyl carbazole is extremely expensive and possesses rather poor mechanical properties. It does, however, possess extremely advantageous electrical characteristics, such as low power factor, high dielectric strength and high corona starting voltage.

It is an object of the present invention to teach the production of a new class of vinyl polymers which retain the advantages of either polystyrene or polyvinylcarbazole. A further object is to produce new polymers of the class described which possesses extremely advantageous electrical properties, as well as satisfactory mechanical characteristics. Further objects of the invention, as well as the advantages of it, will be apparent from this specification and the accompanying claims.

Briefly, the above aims were achieved by the production of a copolymer of triphenylethylene and a compound conforming to the general formula:

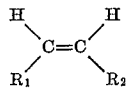

wherein $R_1$ and $R_2$ are radicals of the class consisting of alkyl, aryl, aryl alkyl, alkenyl, arylalkenyl, and hydrogen. More specifically, the compounds of the invention are copolymers of triphenylethylene, and vinyl aromatics, divinyl compounds or butadiene. The copolymers of triphenylethlyene and either styrene or n-vinyl carbazole or both are characterized by the desired dielectric properties. Although these specific monomers hereafter indicated form copolymers throughout all percentage ranges, it is preferred to create copolymers in which no more than 70% and at least about 5% of the composition by weight is derived from triphenylethylene.

Various general classes of compounds have been set forth as those which can be copolymerized with triphenylethylene to obtain dielectric materials susceptible to the impregnation of electrostatic capacitors with a resultant electrical assembly of excellent dielectric properties. As specific examples, within these several classes of compounds the vinyl aromatics are such monomers as styrene, N-vinylcarbazole, p-phenylstyrene, 2-vinylfluorene, 9-methylenefluorene, β vinylnaphthalene, 1-vinylpyrene, methyl methacrylate and acrylonitrile. Under the divinyl compounds the species indicative of compounds falling within this classification are divinyl biphenyl, divinyl butyral, divinyl ketone, divinyl acetylene, divinylbenzene, and halogenated derivatives thereof. Under the butadiene types of compounds susceptible to the copolymerization of triphenylethylene are butadiene-1,3, 2-chlorobutadiene-1,3, 2,3-dichlorobutadiene-1,3, etc.

The new copolymers of the invention can be created by either bulk or emulsion "intermediate" polymerization processes of a type broadly known to the art at the present time. With bulk polymerization the monomeric ingredients employed or, if desired, slightly polymerized ingredients, are physically admixed, and then are polymerized as by the use of heat and/or suitable vinyl polymerization catalysts. Since the temperature of the polymerization in a process of this type is rather important, it is frequently advantageous to incorporate within the polymerization mixture a solvent, such as benzene, chlorobenzene, o-dichlorobenzene, trichloroethylene, methylene dichloride, ethylene dichloride, or the like, which boils at approximately the temperature desired for the bulk polymerization process. In general, a bulk polymerization of this type should not be carried out so as to produce an intermediate product possessing a molecular weight of over about 4000.

Polymerization is frequently conveniently carried out in forming "intermediate" polymers in accordance with the invention by dispersing the monomers employed in an immiscible liquid such as water, together with a suitable polymerization catalyst, and then heating the emulsion mixture so created. The precise temperature and periods of heating required, of course, will vary with the degree of polymerization required, as well as the specific catalyst used. Here again the reaction should not be carried so far as to produce copolymers having molecular weight of greater than about 4000.

With any of the polymerization procedures indicated above, common peroxide catalysts, such as benzoyl peroxide, lauroyl peroxide, tert.-butyl hydrogen peroxide, can be used. Metal alkyls, such as lead tetraethyl can also be employed. Catalyst salts, such as ferric chloride, cobalt chloride, or the like can be utilized as catalysts advantageously in some cases, especially when the entire reaction is carried out in the presence of ultraviolet light. It will be, of course, realized by those skilled in the art that such light is in and of itself capable of acting as a catalyst with the reaction herein disclosed. It almost goes without stating that heat alone, or in conjunction with light, or any of the catalysts specifically indicated above, is a powerful factor in promoting polymerization. In general, the higher the temperature used and/or the greater the concentration of the catalyst, the lower the molecular weight of the intermediate polymer produced. In general, starting and reaction temperatures of above about 90° C. are not preferred with either bulk or emulsion polymerization in order to obtain reasonable control of the reaction speeds. Inasmuch as the polymerization of triphenylethylene with either N-vinyl carbazole or styrene is exothermic, it is usually advantageous to cool the reaction mixture once polymerization has been commenced.

The "intermediate" polymers produced as described above can be molded using established injection molding techniques, at about the same temperatures and pressures now standard throughout the industry for use with polymerized N-vinyl carbazole. These polymers can be plasticized with common plasticizers, such as, for example, tricresyl phosphate, dicapryl phthalate, dibutoxyethyl phthalate, tri-2-ethylhexyl phosphate, methoxy ethyl acetyl ricinoleate, or the like; they can also be mixed with common inert fillers.

It is to be understood by those skilled in the art that the individual copolymers of the invention need not be polymerized during intermediate steps in the forming of satisfactory resinous compositions. Thus, monomeric mixtures as employed can be used directly to impregnate the pores of various electrical devices, such as, for example, convolutely wound electrostatic capacitors, and such mixtures can be polymerized within these pores as by the use of heat either alone or in conjunction with catalysts as discussed above.

The invention herein described is not limited to the method of forming the new copolymers disclosed, but is directed to these copolymers per se, which are extremely advantageous because of their comparatively good mechanical properties, as well as electrical characteristics. It is to be further understood that the herein described and disclosed invention is capable of modification within the scope of the present disclosure. As an example of this, various groups, such as a chlorine atom or an ethyl group can be substituted upon any of the ring structures of any of the monomers specifically employed with the invention. Such modifications, insofar as they are defined by the appended claims are to be considered as part of the instant inventive concept. In order that this specification may be complete under the rules of the Patent Office, the following specific examples of forming the new copolymers of the invention are given. They are not to be considered as limiting in any respect.

*Example 1*

10 grams of triphenylethylene and 10 grams of N-vinyl carbazole were dispersed in 200 milliliters of water by the use of a high speed propeller type agitator, together with 1 gram of benzoyl peroxide. The emulsion was brought to a temperature of 90° C. and maintained at this figure by the use of appropriate automatic temperature regulating instruments. At the end of one-half hour, the reaction mixture was removed, filtered, and washed. This copolymer thus formed could have been used in any of several manners, but it was extruded through a ⅛ inch diameter round orifice at a pressure of 3,000 p. s. i. gauge at a nozzle temperature of 150° C.

*Example 2*

Equal parts by weight of styrene and triphenylethylene were admixed with 10% by weight of chlorobenzene, and milled together at the boiling point of the chlorobenzene solvent for a period of 20 minutes. At the end of this time, the resultant copolymer was separated, the balance of the chlorobenzene was removed by vacuum distillation, and the product was admixed together with 10% by weight of tricresyl phosphate using conventional milling equipment. The intermediate product here produced was then extruded around a small electrical component using conventional molding techniques at the temperatures and pressures specified in the preceding example.

*Example 3*

A small wound electrostatic capacitor employing kraft paper spacers wound between thin aluminum electrode foils was placed within a vacuum chamber and subjected to a pressure of about 10 millimeters of mercury. Then a mixture of 70% of triphenylethylene and 15% N-vinyl carbazole and 15% styrene was introduced into the chamber so as to cover this unit. The excess monomer was drained away and the temperature within the chamber was raised to 150° C. for a period of 30 minutes. At the end of this time, the pores of the capacitor were completely impregnated by the resultant copolymer.

What is claimed is:

1. A copolymer of triphenylethylene and at least one monomer selected from the group consisting of N-vinyl carbazole, styrene, and butadiene.

2. A copolymer of triphenylethylene and styrene.

3. A copolymer of triphenylethylene and N-vinyl carbazole.

4. A copolymer of triphenylethylene and butadiene.

5. A copolymer of a minor amount of triphenylethylene and at least one monomer selected from the group consisting of styrene, N-vinyl carbazole, and butadiene.

6. A copolymer of triphenylethylene and a polymerizable vinyl compound.

7. A copolymer of triphenylethylene and a polymerizable vinyl compound wherein the triphenylethylene forms about 5% to about 70% by weight of the copolymer.

8. A copolymer of triphenylethylene, N-vinyl carbazole and styrene.

No references cited.